US005088459A

United States Patent [19]

Kunimitsu

[11] Patent Number: 5,088,459

[45] Date of Patent: Feb. 18, 1992

[54] DISTRIBUTOR FOR IGNITING COMBUSTION ENGINE

[75] Inventor: Toshiyuki Kunimitsu, Hyogo, Japan

[73] Assignees: Mitsubishi Denki K.K., Tokyo; Nissan Kohki Co., Ltd., Kanagawa, both of Japan

[21] Appl. No.: 658,716

[22] Filed: Feb. 21, 1991

[30] Foreign Application Priority Data

Feb. 22, 1990 [JP] Japan .................................. 2-39780

[51] Int. Cl.$^5$ ......................... F02P 7/10; F16H 55/06

[52] U.S. Cl. ............................................ 123/146.5 A

[58] Field of Search ...................... 123/146.5 A, 90.31

[56] References Cited

U.S. PATENT DOCUMENTS 3,662,726 5/1972 Haskew et al. ............. 123/146.5 A
3,763,841 10/1973 Froumajou ................. 123/146.5 A
4,223,249 9/1980 Eshelman ................... 123/146.5 A

FOREIGN PATENT DOCUMENTS 59-43258 3/1984 Japan .
0126074 7/1984 Japan .......................... 123/146.5 A

*Primary Examiner*—Willis R. Wolfe
*Attorney, Agent, or Firm*—Sughrue, Mion, Zinn, Macpeak & Seas

[57] ABSTRACT

A distributor for igniting a combustion engine which comprises: a movable gear additionally provided rotatably on a first gear; and a resilient member provided between the movable gear and the first gear. The resilient member displaces in an amount larger than a backlash caused between the tooth of the first gear and the tooth of a second gear. As a result, the second gear is clamped between the tooth of the movable gear and the tooth of the first gear by a resilient force of the displaced resilient member, thereby causing no backlash between the teeth of these gears.

16 Claims, 7 Drawing Sheets

DISTRIBUTOR FOR IGNITING COMBUSTION ENGINE

BACKGROUND OF THE INVENTION

1. Field of the Invention

This invention relates to a distributor for igniting a combustion engine which can prevent backlash from being caused between a first gear rotating in synchronism with a crank shaft of the combustion engine and a second gear meshed with the first gear.

2. Related Art

FIG. 17 is a sectional view showing a main portion of an exemplary conventional distributor for igniting a combustion engine. In FIG. 17, reference numeral 1 designates a housing; 2, a rotating shaft rotatably supported by the housing 1 through a sleeve 3 and a, bearing 4, one end of which is projecting toward outside from the housing 1; 5, a fixed helical gear which is inserted into the rotating shaft 2 projecting toward outside and which is held by a pin 6; and 7, a crossed helical gear which is meshed with the fixed gear 5 and which rotates in synchronism with a crank shaft (not shown) of the combustion engine.

In the distributor for igniting a combustion engine thus constructed, the rotating shaft 2 rotates in synchronism with the rotation of the crank shaft through the crossed helical gear 7 and the fixed gear 5, thereby determining the firing timing and the like.

In the conventional distributor for igniting a combustion engine thus constructed, a certain amount of backlash is provided between the teeth of the crossed helical gear 7 and the fixed gear 5 to accommodate fabrication errors and mounting tolerances of the gears, and this backlash has caused undesirable effects such as unstable firing timings and excessive spark advances due to free rotation of the fixed gear 5, the rotating shaft 2, and the like with respect to the crossed helical gear 7 within the backlash assisted by their moment of inertia.

As measures to this problem, a shifted gear may be introduced or gear accuracy may be improved in attempts to reduce the backlash. However, these measures are not successful in completely eliminating the backlash. Rather, a smaller backlash causes seizure and wear, thus impairing the reliability.

SUMMARY OF THE INVENTION

The invention has been made in view of these circumstances. Accordingly, an object of the invention is to provide a distributor for igniting a combustion engine which is free from adverse effects brought about by a backlash.

Another object of the invention is to provide a distributor for igniting a combustion engine which causes no thrust play in a movable gear.

A first aspect of the invention is directed to a distributor for igniting a combustion engine which comprises: a movable gear additionally provided rotatably on one of first and second gears; and a resilient member provided between the movable gear and the one of the first and second gears having the movable gear additionally provided. The resilient member displaces in an amount larger than a backlash caused between a tooth of the first gear and a tooth of the second gear and, as a result, the teeth of the other of the first and second gears not having the movable gear additionally provided are interposed and pressed between the teeth of the movable gear and those of the one of the first and second gears having the movable gear additionally provided by a resilient force of the displaced resilient member.

A second aspect of the invention is directed to a distributor for igniting a combustion engine which comprises: a movable gear additionally provided rotatably on a second gear; a stopper ring, disposed on an end portion of a rotating shaft, for preventing the movable gear from falling off the rotating shaft; a resilient member disposed between the movable gear and the second gear having the movable gear additionally provided; and a pressing member, disposed on the rotating shaft, for pressing the movable gear onto the second gear or the stopper ring. The resilient member displaces in an amount larger than a backlash caused between a tooth of a first gear and a tooth of the second gear and, as a result, the teeth of the first gear are interposed and pressed between the teeth of the movable gear and those of the second gear by a resilient force of the displaced resilient member.

In the first aspect of the invention, the teeth of one of the gears are interposed and pressed between the teeth of the other gear and those of the movable gear by the resilient force of the resilient member, thereby causing no backlash between the teeth of these gears.

In the second aspect of the invention, the pressing member causes the movable gear to be pressed onto the second gear or the stopper ring, thereby causing no thrust play in the movable gear.

DETAILED DESCRIPTION OF THE PREFERRED EMBODIMENTS

Figure 1:
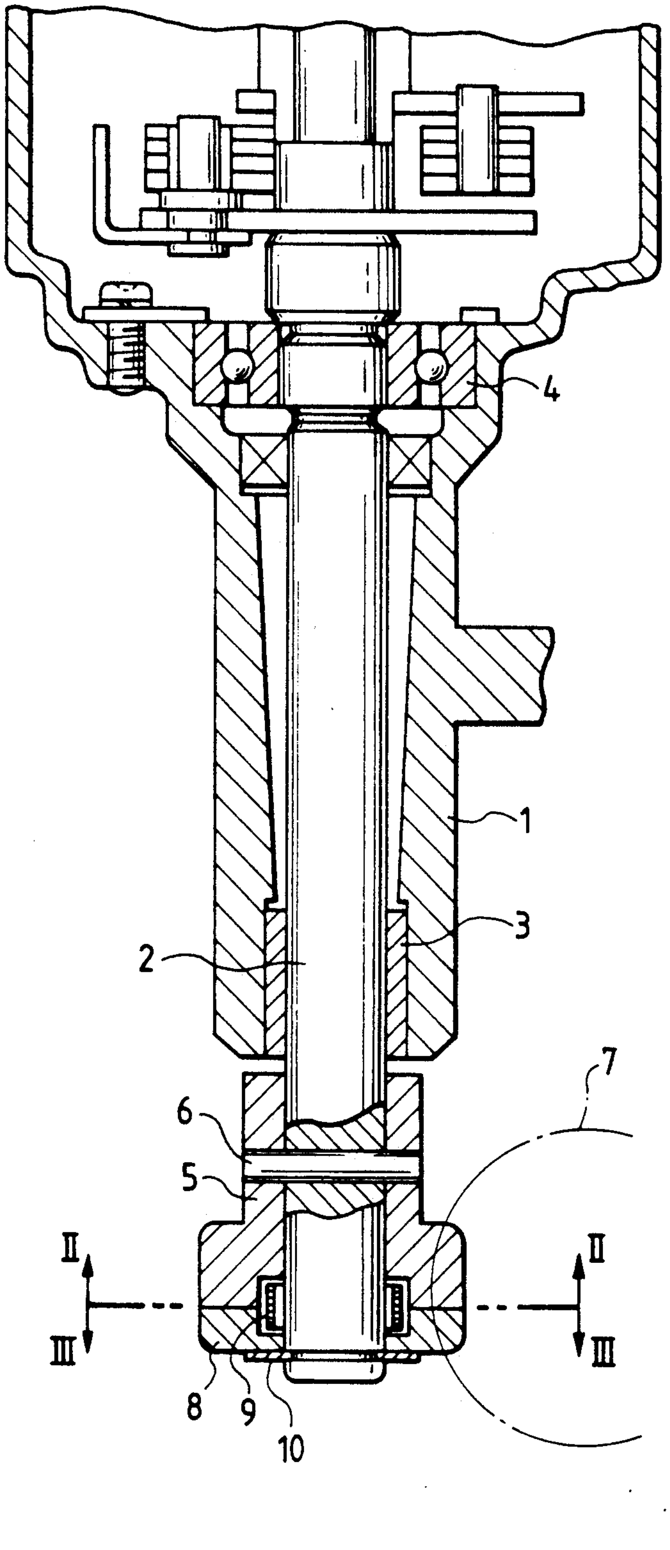
FIG. 1 is a sectional view showing a main portion of a first embodiment of a first aspect of the invention.
Figure 2:
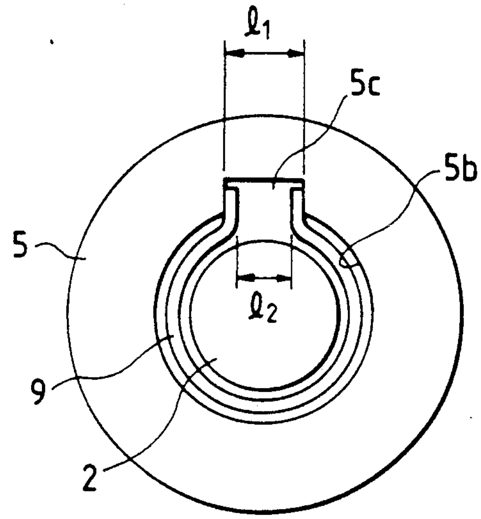
FIG. 2 is a sectional view taken along a line II—II shown in FIG. 1.
Figure 3:
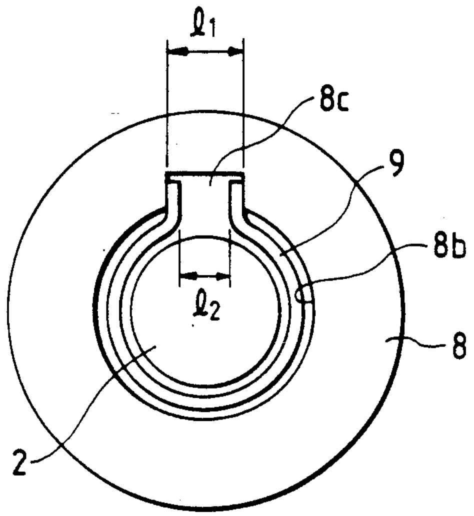
FIG. 3 is a sectional view taken along a line III—III shown in FIG. 1.
Figure 17:
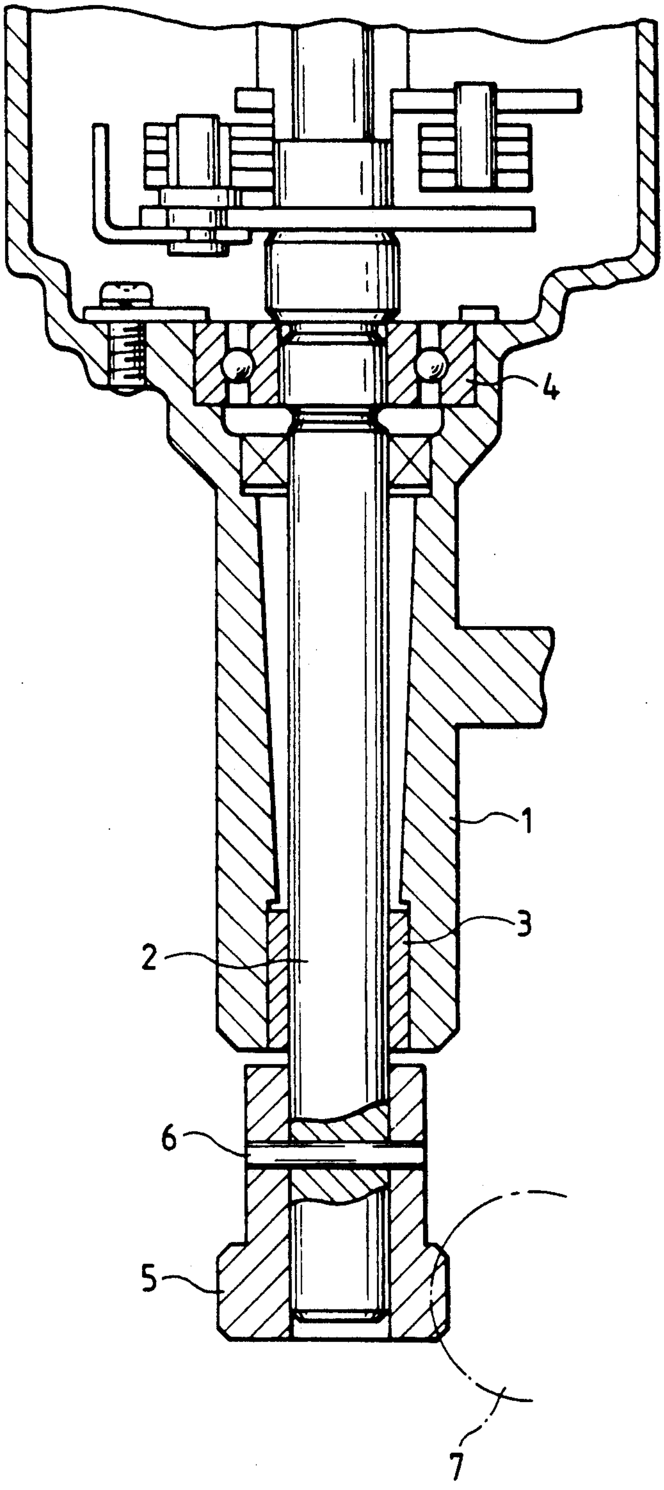
FIG. 17 is a sectional view showing a main portion of an exemplary conventional distributor for igniting a combustion engine.

Embodiments of the invention will now be described with reference to the accompanying drawings. FIG. 1 is a sectional view showing a main portion of a first embodiment of a first aspect of the invention; FIG. 2 is a sectional view taken along a line II—II shown in FIG. 1; and FIG. 3 is a sectional view taken along a line III—III shown in FIG. 1. Like reference numerals in these figures designate like parts and components shown in FIG. 17 and descriptions thereof will thus be omitted.

Figure 4:
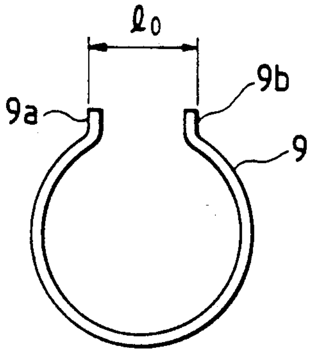
FIG. 4 is a plan view of a plate spring shown in FIG. 1.
Figure 5:
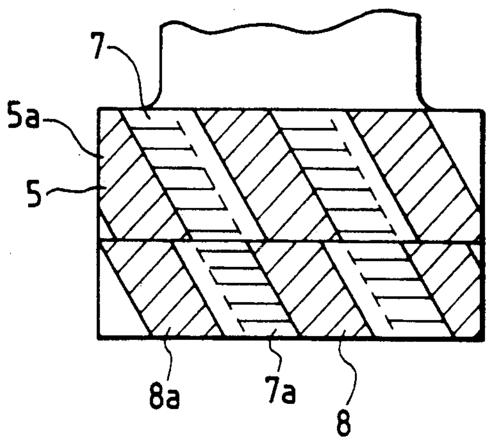
FIG. 5 is a state diagram showing a state that the teeth of a fixed gear, a movable gear, and a crossed helical gear shown in FIG. 1 are meshed.

In FIGS. 1, 2, 3, reference numeral 5 designates a fixed gear which is a helical gear serving as a second gear; 8, a movable gear, which is also a helical gear, not only idly inserted into an end portion of a rotating shaft 2 but also meshed with a crossed helical gear 7 serving as a first gear; 9, a belt-like plate spring serving as a resilient member, which has a circular shape and whose ends are bent up to form stopper portions *9a, 9b* as shown in FIG. 4. The stopper portions *9a, 9b* are held by a stopper groove *5c* arranged at a recess *5b* of the fixed gear 5 and a stopper groove *8c* arranged at a recess *8b* of the movable gear 8, respectively. The distance $l_0$ between the stopper portion *9a* and the stopper portion *9b* is flexed to a distance $l_1$ so that the stopper portions *9a, 9b* are engaged with the stopper groove *5c* at the recess *5b* and the stopper groove *8c* at the recess *8b*, respectively. As a result, when the movable gear 8 starts to rotate relative to a direction of rotating the fixed gear 5, the distance $l_1$ is further decreased, thereby causing the plate spring 9 to suppress the relative operation between the movable gear 8 and the fixed gear 5. The distance $l_2$ which is defined when the stopper portion *9a* and the stopper portion *9b* are engaged with the stopper groove *5c* of the fixed gear 5 and the stopper groove *8c* of the movable gear 8, respectively, serves to determine a movable amount of the movable gear 8 in a circumferential direction, and this amount is set to a value larger than an amount of backlash between the fixed gear 5 and the crossed helical gear 7. In this case, a shift between the tooth trace of a tooth *8a* of the movable gear 8 and the tooth trace of a tooth *5a* of the fixed gear 5 is larger than the amount of backlash. Thus, when the crossed helical gear 7 is meshed with both the fixed gear 5 and the movable gear 8, the crossed helical gear 7 is pressed onto the fixed gear 5 through the movable gear 8 without fail by a resilient force from the plate spring 9. That is, a tooth *7a* of the crossed helical gear 7 is clamped between the tooth *5a* of the fixed gear 5 and the tooth *8a* of the movable gear 8. Reference numeral 10 designates a stopper ring for preventing the movable gear 8 from falling off the rotating shaft 2.

In the distributor for igniting a combustion engine thus constructed, the tooth *7a* of the crossed helical gear 7 is interposed between the tooth *5a* of the fixed gear 5 and the tooth *8a* of the movable gear 8 by the resilient force of the plate spring 9 and pressed by a predetermined circumferentially applied force. As a result, when the crossed helical gear 7 is being rotated, the movement of the tooth *5a* of the fixed gear 5 and the tooth *8a* of the movable gear 8 relative to the tooth *7a* of the crossed helical gear 7 is suppressed, thereby allowing a stable firing characteristic to be obtained. Since the movable gear 8 and the fixed gear 5 move relative to each other, resisting the resilient force of the plate spring 9, it is ensured that the rotating shaft 2 can rotate smoothly and it is prevented that the fixed gear 5, the movable gear 8, and the crossed helical gear 7 are subjected to seizure and wear.

However, a contact surface between the fixed gear 5 and the movable gear 8 is large in the first embodiment, and this makes it likely to hamper smooth rotation of the movable gear 8. If burs or the like are present on the contact surface, the operation of the movable gear 8 will suffer from further inconvenience.

Figure 6:
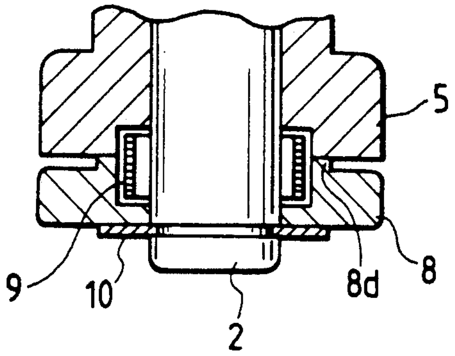
FIG. 6 is a sectional view showing a main portion of a second embodiment of the first aspect of the invention.

FIG. 6 shows a second embodiment which has been made to overcome the above problem. The movable gear 8 is provided with a projection *8d* so that the contact surface between the movable gear 8 and the fixed gear 5 is reduced. The projection may be arranged on the fixed gear 5 instead of on the movable gear 8, or may be arranged on both the fixed gear 5 and the movable gear 8.

Figure 7:
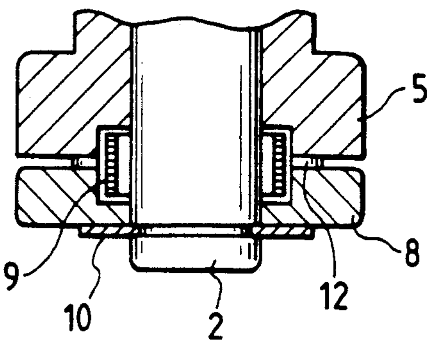
FIG. 7 is a sectional view showing a main portion of a third embodiment of the first aspect of the invention.

FIG. 7 shows a third embodiment of the first aspect of the invention which has been made to achieve the same object as that of the second embodiment. A washer 12 is arranged between the fixed gear 5 and the movable gear 8. Use of a plane bearing material for the washer will further improve the situation.

Figure 8:
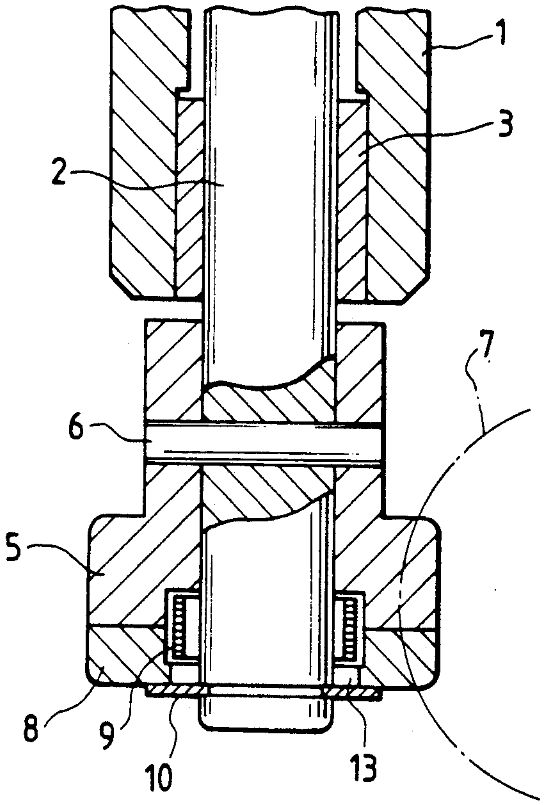
FIG. 8 is a sectional view showing a main portion of a fourth embodiment of the first aspect of the invention.

FIG. 8 shows a fourth embodiment of the first aspect of the invention. A bearing metal 13 is provided between the rotating shaft 2 and the movable gear 8 to improve the durability of the rotating shaft 2 and the movable gear 8.

Figure 9:
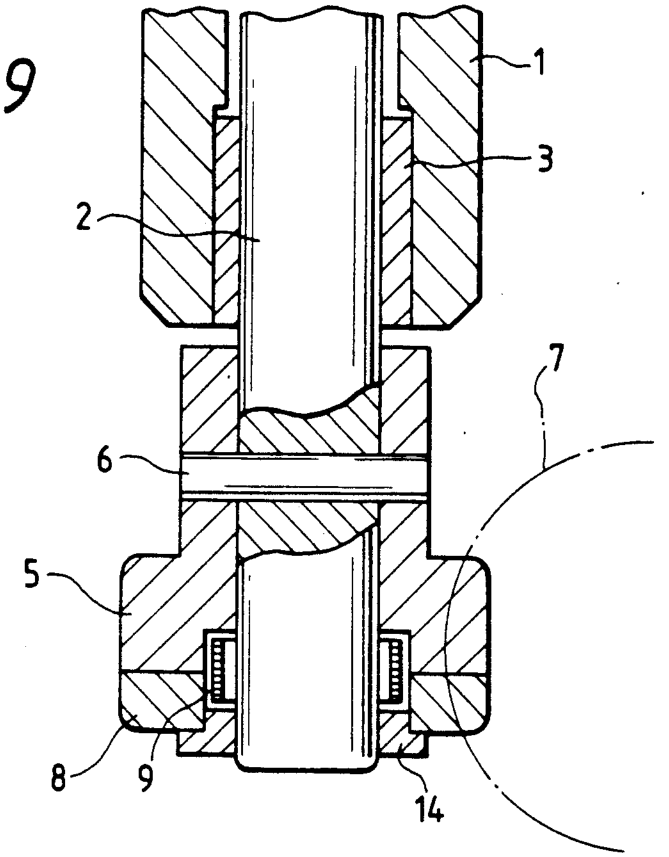
FIG. 9 is a sectional view showing a main portion of a fifth embodiment of the first aspect of the invention.

FIG. 9 shows a fifth embodiment of the first aspect of the invention. A bearing metal 14 is fixed integrally with the rotating shaft 2 not only to improve the durability of the rotating shaft 2 and the movable gear 8 but also to serve as a stopper ring for preventing the movable gear 8 from falling off the rotating shaft 2.

Figure 10:
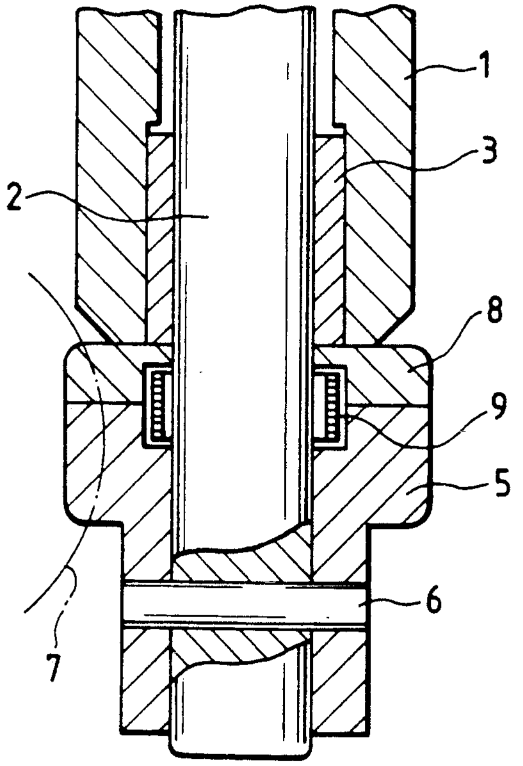
FIG. 10 is a sectional view showing a main portion of a sixth embodiment of the first aspect of the invention.

FIG. 10 shows a sixth embodiment of the first aspect of the invention. The movable gear 8 is interposed between the housing 1 and the fixed gear 5. This construction dispenses with a stopper ring.

Figure 11:
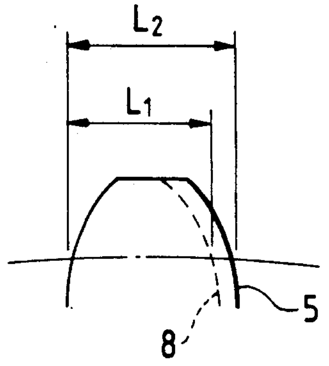
FIG. 11 is a sectional view showing a main portion of a seventh embodiment of the first aspect of the invention.

The teeth *8a* of the movable gears 8 in any of these embodiments are helical and identical with those *5a* of their fixed gears 5. In this connection, what is important for the movable gear 8 is its tooth surface which abuts against the crossed helical gear 7 and its tooth surface that does not abut thereagainst is not so important. Thus, as a seventh embodiment of the first aspect of the invention shown in FIG. 11, a tooth thickness $L_1$ of the movable gear 8 may be set to a value smaller than a tooth thickness $L_2$ of the fixed gear 5. This will relax accuracy requirements in forming the movable gear 8 and thus improve the cost.

Figure 12:
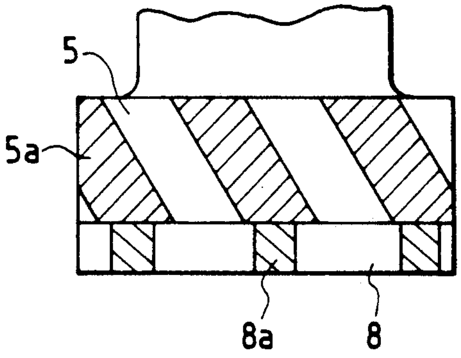
FIG. 12 is a sectional view showing a main portion of an eighth embodiment of the first aspect of the invention.

FIG. 12 shows an eighth embodiment of the first aspect of the invention, in which a plane gear is applied to the movable gear 8 for the same reason as in the seventh embodiment. This will not only allow the gear to be fabricated by a cold forging process and more economically than before.

Figure 13:
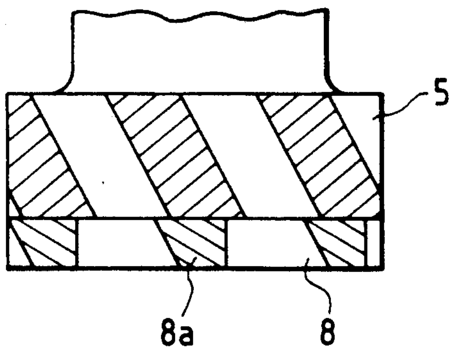
FIG. 13 is a sectional view showing a main portion of a ninth embodiment of the first aspect of the invention.

In case of the eighth embodiment, a corner portion of each tooth of the movable gear 8 abuts against the crossed helical gear 7, thus making it unadvantageous in terms of durability. Thus, as shown in FIG. 13, one of the surfaces of each tooth *8a* of the movable gear 8 is cut so that only the tooth surface that abuts against the crossed helical gear 7 is helical.

In addition, while the above embodiments have their plate spring 9 interposed between the movable gear 8 and the fixed gear 5, it may be so constructed that the movable gear is provided on the crossed helical gear and that the plate spring is provided between the movable gear and the crossed helical gear.

Figure 14:
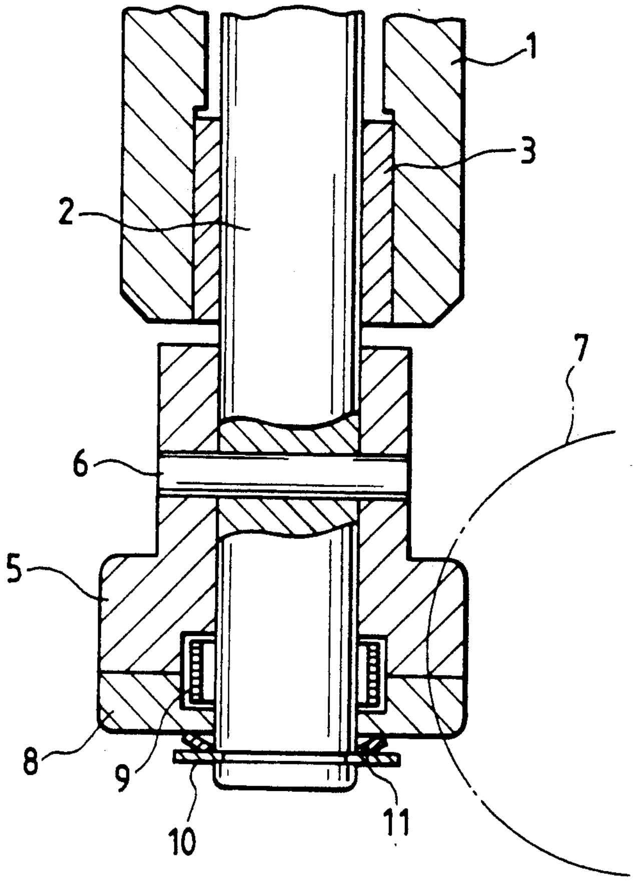
FIG. 14 is a sectional view showing a main portion of a first embodiment of a second aspect of the invention.

FIG. 14 is a sectional view showing a main portion of a first embodiment of a second aspect of the invention. A pressing member 11 is provided between the movable gear 8 and the stopper ring 10. The pressing member 11 is biased so that the movable gear 8 is pressed onto the fixed gear 5. Thus, in the second aspect of the invention, there will be no thrust play in the movable gear 8 which is attributable to the accuracy in forming the fixed gear 5 and the movable gear 8, thereby eliminating undesirable factors hampering the durability.

Figure 15:
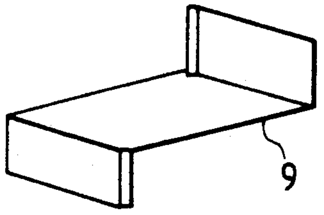
FIG. 15 is a sectional view of a plate spring showing a second embodiment of the second aspect of the invention.
Figure 16:
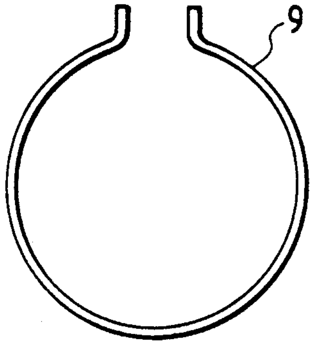
FIG. 16 is a plan view of the plate spring shown in FIG. 15.

FIGS. 15 and 16 show a second embodiment of the second aspect of the invention. The plate spring 9 is formed by bending up and down so that the plate spring 9 will be given a function serving both as an resilient member and a pressing member. Thus, the movable gear 8 is pressed onto the stopper ring 10, causing no thrust play in the movable gear 8.

As described in the foregoing. according to the distributor for igniting a combustion engine in the first aspect of the invention, the teeth of one of the gears are interposed and pressed between the teeth of the other gear and those of the movable gear by the resilient force of the resilient member, thereby providing the advantage of causing no backlash between the teeth of these gears.

According to the second aspect of the invention, the pressing member causes the movable gear to be pressed onto the second gear or the stopper ring, thereby providing the advantage of causing no thrust play in the movable gear.

What is claimed is:

1. A distributor for igniting a combustion engine including: (7) a first gear in synchronism with a crank shaft of said combustion engine; a second gear (5) meshed with said first gear (7); a rotating shaft (2) firmly secured to said second gear (5) having a distributing rotor on an end portion thereof, said distributing rotor being rotated through said first gear (7), said second gear (5) and said rotating shaft (2) as said crank shaft rotates so that a high voltage is sequentially distributed to a plug of each of cylinder of said combustion engine; said distributor further comprising:

a movable gear (8) rotatably provided on one of said first and second gears (5 or 7); and a resilient member (9) provided between said movable gear (8) and said one of said first and second gears (5 or 7) having said movable gear (8), said resilient member (9) displacing radially in an amount larger than a backlash caused between a tooth of said first gear (7) and a tooth of said second gear (5), whereby said tooth of the other of said first and second gears (5 or 7) not having said movable gear (8) is interposed and pressed between a tooth of said movable gear (8) and said tooth of said one of said first and second gears (5 or 7) having said movable gear (8) by a resilient force of said displaced resilient member (9).

2. A distributor for igniting a combustion engine including: a first gear (7) rotating in synchronism with a crank shaft of said combustion engine; a second gear (5) meshed with said first gear (7); a rotating shaft (2) firmly secured to said second gear (5) and having a distributing rotor on an end portion thereof, said distributing rotor being rotated through said first gear (7), said second gear (5) and said rotating shaft (2) as said crank shaft rotates so that a high voltage is sequentially distributed to a plug of each cylinder of said combustion engine; said distributor further comprising:

a movable gear (8) rotatably provided on one of said first and second gears (5 or 7); and a resilient member (9) provided between said movable gear (8) and said one of said first and second gears (5 or 7) having said movable gear (8), said resilient member (9) displacing in an amount larger than a backlash caused between a tooth of said first gear (7) and a tooth of said second gear (5), whereby said tooth of the other of said first and second gears (5 or 7) not having said movable gear (8) is interposed and pressed between a tooth of said movable gear (8) and said tooth of said one of said first and second gears (5 or 7) having said movable gear (8) by a resilient force of said displaced resilient member (9), in which the teeth (8*a*) of said movable gear (8) are helical and identical with the teeth (5*a* ) of said second gear.

3. A distributor for igniting a combustion engine including: a first gear (7) rotating in synchronism with a crank shaft of said combustion engine; a second gear (5) meshed with with said first gear (7); a rotating shaft (2) firmly secured to said second gear (5) and having a distributing rotor on an end portion thereof, said distributing rotor being rotated through said first gear (7), said second gear (5) and said rotating shaft (2) as said crank shaft rotates so that a high voltage is sequentially distributed to a plug of each cylinder of said combustion engine; said distributor further comprising:

a movable gear (8) rotatably provided on one of said first and second gears (5 or 7); and a resilient member (9) provided between said movable gear (8) and said one of said first and second gears (5 or 7) having said movable gear (8), said resilient member (9) displacing in an amount larger than a backlash caused between a tooth of said first gear (7) and a tooth of said second gear (5), whereby said tooth of the other of said first and second gears (5 or 7) not having said movable gear (8) is interposed and pressed between a tooth of said movable gear (8) and said tooth of said one of said first and second gears (5 or 7) having said movable gear (8) by a resilient force of said displaced resilient member (9), in which the tooth thickness (L1) of said movable gear (8) is set to a value smaller than a tooth thickness (L2) of said second gear (5).

4. A distributor for igniting a combustion engine including: a first gear (7) rotating in synchronism with a crank shaft of said combustion engine; a second gear (5) meshed with said first gear (7); a rotating shaft (2) firmly secured to said second gear (5) and having a distributing rotor on an end portion thereof, said distributing rotor being rotated through said first gear (7), said second gear (5) and said rotating shaft (2) as said crank shaft rotates so that a high voltage is sequentially distributed to a plug of each cylinder of said combustion engine; said distributor further comprising:

a movable gear (8) rotatably provided on one of said first and second gears (5 or 7); and a resilient member (9) provided between said movable gear (8) and said one of said first and second gears (5 or 7) having said movable gear (8), said resilient member (9) displacing in an amount larger than a backlash caused between a tooth of said first gear (7) and a tooth of said second gear (5), whereby said tooth of the other of said first and second gears (5 or 7) not having said movable gear (8) is interposed and pressed between a tooth of said movable gear (8) and said tooth of said one of said first and second gears (5 or 7) having said movable gear (8) by a resilient force of said displaced resilient member (9), in which said resilient member (9) is formed by bending up and down so as to prevent said movable gear (8) from thrust playing.

5. A distributor for igniting a combustion engine including: a first gear (7) rotating in synchronism with a crank shaft of said combustion engine; a second gear (5) meshed with said first gear (7); a rotating shaft (2) firmly secured to said second gear (5) and having a distributing rotor on an end portion thereof, said distributing rotor being rotated through said first and second gears (5 and 7) and said rotating shaft (2) as said crank shaft rotates so that a high voltage is sequentially distributed to a plug of each cylinder of said combustion engine; said distributor further comprising:

a movable gear (8) additionally provided rotatably on said second gear (5);

a stopper ring (10), disposed on an end portion of said rotating shaft (2), for preventing said movable gear (8) from being dropped from said rotating shaft (2);

a resilient member (9) disposed between said movable gear (8) and said second gear (5) having said movable gear (8) additionally provided; and a pressing member (11), disposed on said rotating shaft (2), for pressing said movable gear (8) onto said second gear (5) or said stopper ring (10);

said resilient member (9) displacing radially in an amount larger than a backlash caused between a tooth of said first gear (7) and a tooth of said second gear (5), whereby said tooth of said first gear (7) is interposed and pressed between a tooth of said movable gear (8) and said tooth of said second gear (5) by a resilient force of said displaced resilient member (9).

6. A distributor for igniting a combustion engine including: a first gear (7) rotating in synchronism with a crank shaft of said combustion engine; a second gear (5) meshed with said first gear (7); a rotating shaft (2) firmly secured to said second gear (5) and having a distributing rotor on an end portion thereof, said distributing rotor being rotated through said first gear (7), said second gear (5) and said rotating shaft (2) as said crank shaft rotates so that a high voltage is sequentially distributed to a plug of each cylinder of said combustion engine; said distributor further comprising:

a movable gear (8) rotatably provided on one of said first and second gears (5 or 7); and a resilient member (9) provided between said movable gear (8) and said one of said first and second gears (5 or 7) having said movable gear (8), said resilient member (9) displacing in an amount larger than a backlash caused between a tooth of said first gear (7) and a tooth of said second gear (5), whereby said tooth of the other of said first and second gears (5 or 7) not having said movable gear (8) is interposed and pressed between a tooth of said movable gear (8) and said tooth of said one of said first and second gears (5 or 7) having said movable gear (8) by a resilient force of said displaced resilient member (9), in which said one of first and second gear (5 or 7) has a stopper groove (5*c*), said movable gear (8) has a stopper groove (8*c*), and said resilient member (9) comprising a belt-like plate spring which has a circular shape and whose ends (9*a*, 9*b*) are bent up, said ends (*a*, 9*b*) of said resilient member (9) are engaged with said stopper groove (5*c*) of said second gear (5) and said stopper groove (8*c*) of said movable gear (8).

7. A distributor for igniting a combustion engine according to claim 6, in which said movable gear (8) is interposed between said distributing rotor and said second gear (5).

8. A distributor for igniting a combustion engine according to claim 6, in which said second gear (5) is a helical gear and said movable gear (8) is a plane gear.

9. A distributor for igniting a combustion engine according to claim 8, in which said second gear (5) is a helical gear and one of the surfaces of each tooth (8*a*) of said movable gear (8) is cut so that the tooth surface that abuts against said second gear (7) is helical.

10. A distributor for igniting a combustion engine according to claim 6, in which said one of said first and second gears (5 or 7) is said second gear (5) and said the other of said first and second gears (5 or 7) is said first gear (7).

11. A distributor for igniting a combustion engine according to claim 10, in which at least one of said second gear (5) and said movable gear (8) has at least one projection (8*d*) for reducing a contact surface between said second gear (5) and said movable gear (8).

12. A distributor for igniting a combustion engine according to claim 10, further comprising:

a washer (12) arranged between said second gear (5) and said movable gear (8).

13. A distributor for igniting a combustion engine according to claim 10, further comprising:

a bearing metal (13) provided between said rotating shaft (2) and said movable gear (8).

14. A distributor for igniting a combustion engine according to claim 10, in which said rotating shaft (2) having a bearing metal (14) which is fixed integrally with said rotating shaft (2).

15. A distributor for igniting a combustion engine according to claim 10, further comprising:

a stopper ring (10), disposed on an end portion of said rotating shaft (2), for preventing said movable gear from being dropped from said rotating shaft (2).

16. A distributor for igniting a combustion engine according to claim 15, further comprising:

a pressing member (11) provided between said movable gear (8) and said stopper ring (10), said pressing member (11) being biased so that said movable gear is pressed onto said second gear (5).

* * * * *